US006655084B1

United States Patent
Missry

(10) Patent No.: US 6,655,084 B1
(45) Date of Patent: Dec. 2, 2003

(54) PLANTER CADDIE HAVING A TRAY WITH WELLS FOR RECEIVING WHEELS AND STACKING CADDIES

(75) Inventor: Ezra Missry, Dunellen, NJ (US)

(73) Assignee: Misco Enterprises, Inc., Dunellen, NJ (US)

( * ) Notice: Subject to any disclaimer, the term of this patent is extended or adjusted under 35 U.S.C. 154(b) by 0 days.

(21) Appl. No.: 10/367,356

(22) Filed: Feb. 14, 2003

(51) Int. Cl.$^7$ .................................................. A01G 9/04
(52) U.S. Cl. ................................................ 47/71; 47/39
(58) Field of Search ........................................ 47/39, 71

(56) References Cited

U.S. PATENT DOCUMENTS

| 1,820,843 | A | * | 8/1931 | Spitz | 47/39 |
| 2,947,548 | A | * | 8/1960 | Bard | 280/79.2 |
| 3,676,953 | A | * | 7/1972 | Delogne | 47/81 |
| 3,972,419 | A | * | 8/1976 | Short | 211/78 |
| 4,638,595 | A | * | 1/1987 | Rivero | 47/39 |
| 5,094,031 | A | * | 3/1992 | Lee | 47/39 |
| 5,209,013 | A | * | 5/1993 | Sellers | 47/71 |
| 5,309,670 | A | * | 5/1994 | Bates | 47/71 |
| D367,244 | S | * | 2/1996 | Sellers | D11/164 |
| D373,328 | S | * | 9/1996 | Sellers | D11/164 |
| D373,329 | S | * | 9/1996 | Sellers | D11/164 |
| 5,819,469 | A | * | 10/1998 | Hsu | 47/39 |
| 6,517,035 | B1 | * | 2/2003 | Sellers | 248/146 |

FOREIGN PATENT DOCUMENTS

JP            409172873 A    *   7/1997            A01G/9/04

* cited by examiner

Primary Examiner—Peter M. Poon
Assistant Examiner—Son T. Nguyen
(74) Attorney, Agent, or Firm—Ezra Sutton

(57) ABSTRACT

A planter caddie for supporting planters including a frame having a support surface and four wheels attached thereto. The support surface includes four support members for forming four receiving spaces in the support surface. The planter caddie also includes a plastic tray removably disposed on the support surface. The plastic tray includes four recessed pockets for receipt within the four receiving spaces of the four support members. The plastic tray further includes four recessed wells, one within each of the four recessed pockets for collecting water and for receiving the wheels of another planter caddie stacked thereon.

22 Claims, 5 Drawing Sheets

PLANTER CADDIE HAVING A TRAY WITH WELLS FOR RECEIVING WHEELS AND STACKING CADDIES

FIELD OF THE INVENTION

The present invention relates to a planter caddie for supporting one or more planters thereon. More particularly, the planter caddie includes a support tray having recessed wells formed therein for receiving wheels of another caddie for the stacking of multiple planter caddies to save space during shipment, storage, or display.

BACKGROUND OF THE INVENTION

Planter caddies and plant holders having a support tray and wheels for moving the planter caddy around are known in the prior art. These planter caddies have only limited devices for the collection of excess water from a planter being held on the support tray. Further, these planter caddies are not designed to be stackable for shipping from the manufacturer to a wholesaler or commercial store/company for resale.

There remains a need for a planter caddie having a plastic support tray with a plurality of spaced-apart recessed wells for receiving the wheels of another planter caddie therein for the purpose of stacking multiple planter caddies for compactness and saving space within a shipping carton or during display for sale. Further, the recessed wells will also serve as water collection compartments for collecting excess water when watering a plant within the planter. Additionally, the planter caddie will have a frame member having a plurality of support brackets for receiving a plurality of spaced-apart recessed pockets therein in order to allow the securing and positioning of the plastic support tray in a firm manner within the frame of the planter caddie.

DESCRIPTION OF PRIOR ART

Planter caddies and plant holders of various designs, configurations, structures, and materials of construction have been disclosed in the prior art. For example, U.S. Design Pat. No. 411,058 discloses a plant caddy with a built-in saucer having a plurality of spaced-apart recessed pockets. The plant caddy also includes a frame member having a plurality of spaced-apart wheels thereon. This prior art design patent does not teach or disclose the structure and configuration of the planter caddie of the present invention.

U.S. Design Pat. Nos. 367,244; 373,328; and 373,329 all disclose a plant saucer for multiple plant groupings. The plant saucer includes a plurality of recessed channels within a support surface. These prior art design patents do not teach or disclose the structure and configuration of the planter caddie of the present invention.

U.S. Pat. No. 5,209,013 discloses a potted plant support device which preserves carpet pile, prevents matting of the carpet pile, and prevents carpet crush and stains. The plant support device includes a planter support surface having a plurality of support member cavities therein. The support member cavities function as overflow traps which help to minimize any carpet pile water seepage resulting from overfilling the plant pot. The support member cavities also function as an elevated support member in order to raise the plant support device above the carpet pile surface. This prior art patent does not teach or disclose the structure and configuration of the planter caddie of the present invention.

None of the prior art patents disclose or teach a planter caddie having a support tray with recessed wells for receiving the wheels of another caddie for stacking of multiple planter caddies during storage and/or shipment of the planter caddies to a store or warehouse.

Accordingly, it is an object of the present invention to provide a planter caddie having a support tray with recessed wells therein for receiving the wheels of another planter caddie for the stacking of multiple planter caddies for compactness during storage in a warehouse or when shipped to a store/nursery outlet.

Another object of the present invention is to provide a planter caddie such that the recessed wells serve the dual purpose of collecting water from a planter and for allowing the stacking of the planter caddies during shipping in order to save space.

Another object of the present invention is to provide a planter caddie that has a plastic support tray having a plurality of spaced-apart recessed pockets that are received within support brackets of a frame in order to secure the plastic support tray within the frame.

Another object of the present invention is to provide a planter caddie that has a recessed well being centrally positioned within each recessed pocket for additional collection of excess water from the planter.

Another object of the present invention is to provide a planter caddie that has a center recessed well within the plastic support tray for the further collection of excess water from the planter.

A further object of the present invention is to provide a planter caddie that can be mass produced in an automated and economical manner and is readily affordable by the user.

SUMMARY OF THE INVENTION

In accordance with the present invention, there is included a planter caddie for supporting planters. The planter caddie includes a frame having a support surface and four wheels attached thereto. The support surface includes four support members for forming four receiving spaces in the support surface. The planter caddie also includes a plastic tray removably disposed on the support surface. The plastic tray includes four recessed pockets for receipt within the four support members to hold the plastic tray in place. The plastic tray further includes a recessed well within each of the four recessed pockets for collecting water and for receiving the wheels of another planter caddie stacked thereon. Additionally, the plastic tray includes a center recessed well for collecting water from a planter supported on the planter caddie.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein:

FIG. 4 is a rear perspective view of the planter caddie of the present invention showing the frame member having four swivel wheels thereon;

DETAILED DESCRIPTION OF THE PREFERRED EMBODIMENT

Figure 1:
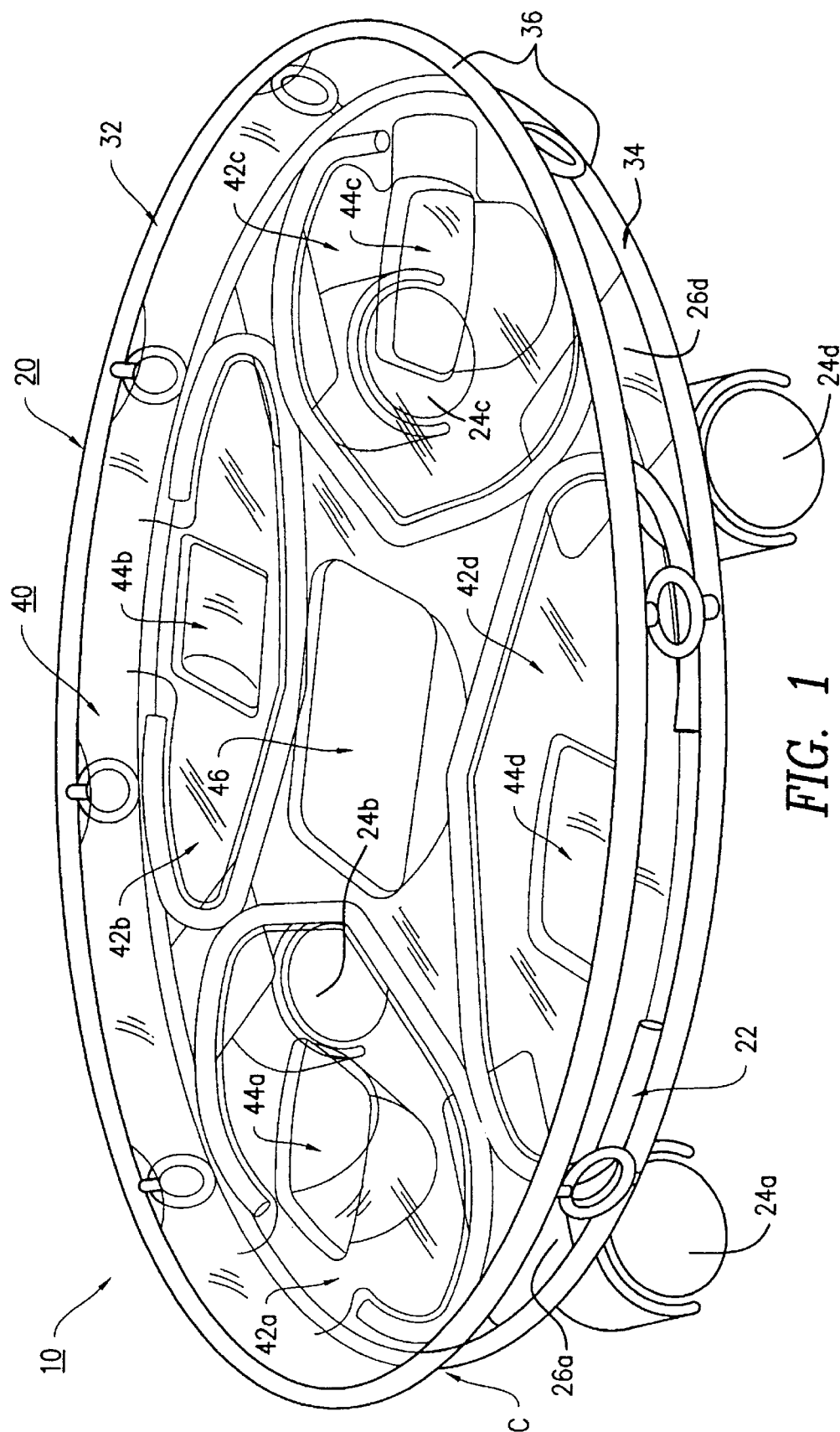
FIG. 1 is a perspective view of the planter caddie of the preferred embodiment of the present invention showing the major component parts in an assembled configuration.
Figure 2:
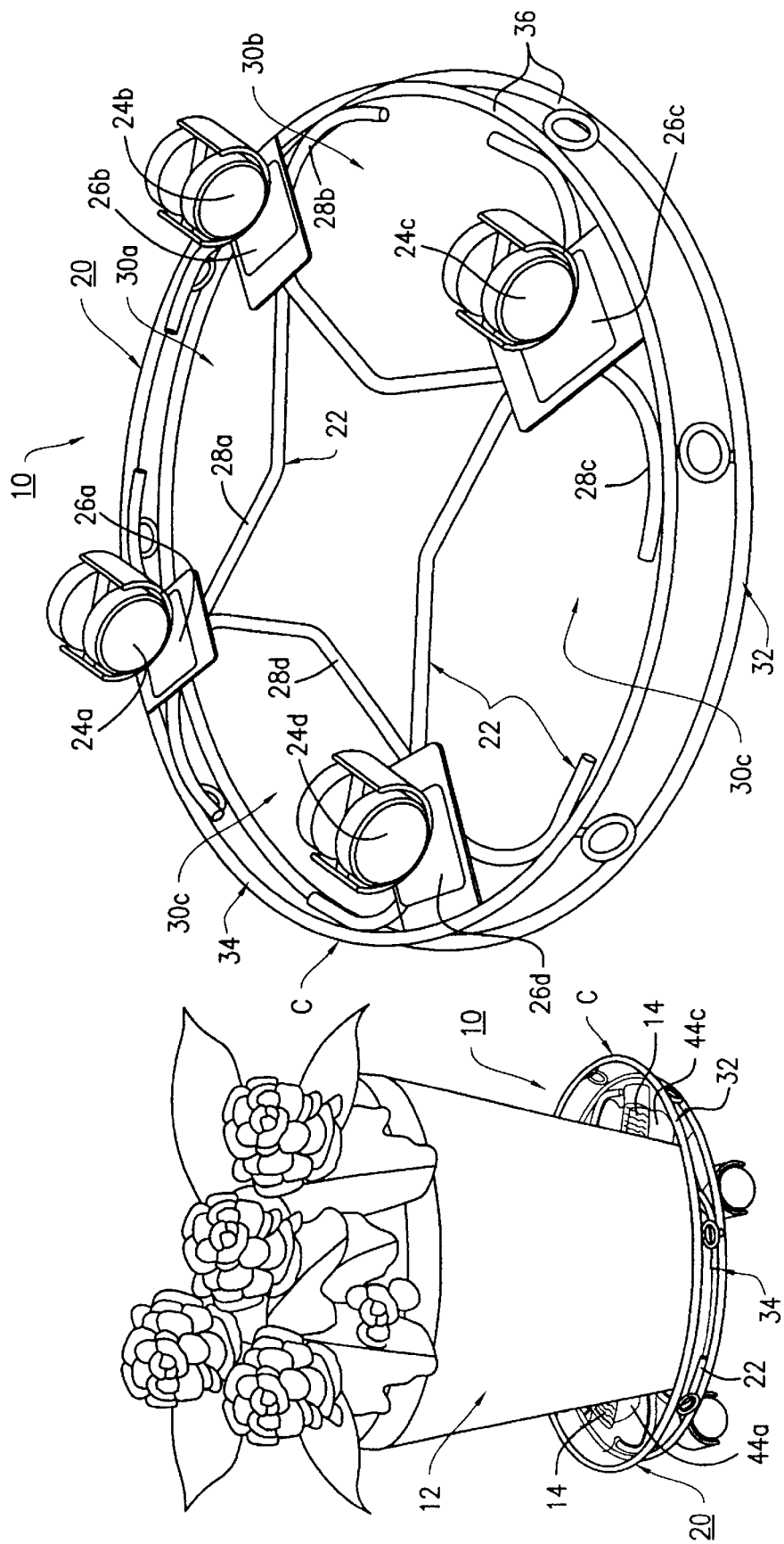
FIG. 2 is a perspective view of the planter caddie of the present invention showing the planter caddie in operational use thereof.

The planter caddie 10 and its component parts of the preferred embodiment of the present invention are represented in detail by FIGS. 1 through 6 of the patent drawings. The planter caddie 10 is used for supporting one or more planters 12 and includes a frame member 20 having a support surface 22 and a plurality of four wheels 24a, 24b, 24c, and 24d attached thereto as depicted in FIGS. 1 and 2. Each of the wheels 24a, 24b, 24c, and 24d is swivelly mounted on a wheel support bracket 26a, 26b, 26c, and 26d, respectively. Each of the wheel support brackets 26a to 26d are attached in a spaced-apart 90° relationship to the support surface 22 of frame 20. The support surface 22 includes four support members 28a, 28b, 28c, and 28d for forming four receiving spaces 30a, 30b, 30c, and 30d in support surface 22. Each of the wheel support brackets 26a, 26b, 26c, and 26d are attached to two adjacent support members 28d and 28a, 28a and 28b, 28b and 28c and 28c and 28d, respectively, as shown in FIG. 4 of the drawings.

Figure 3:
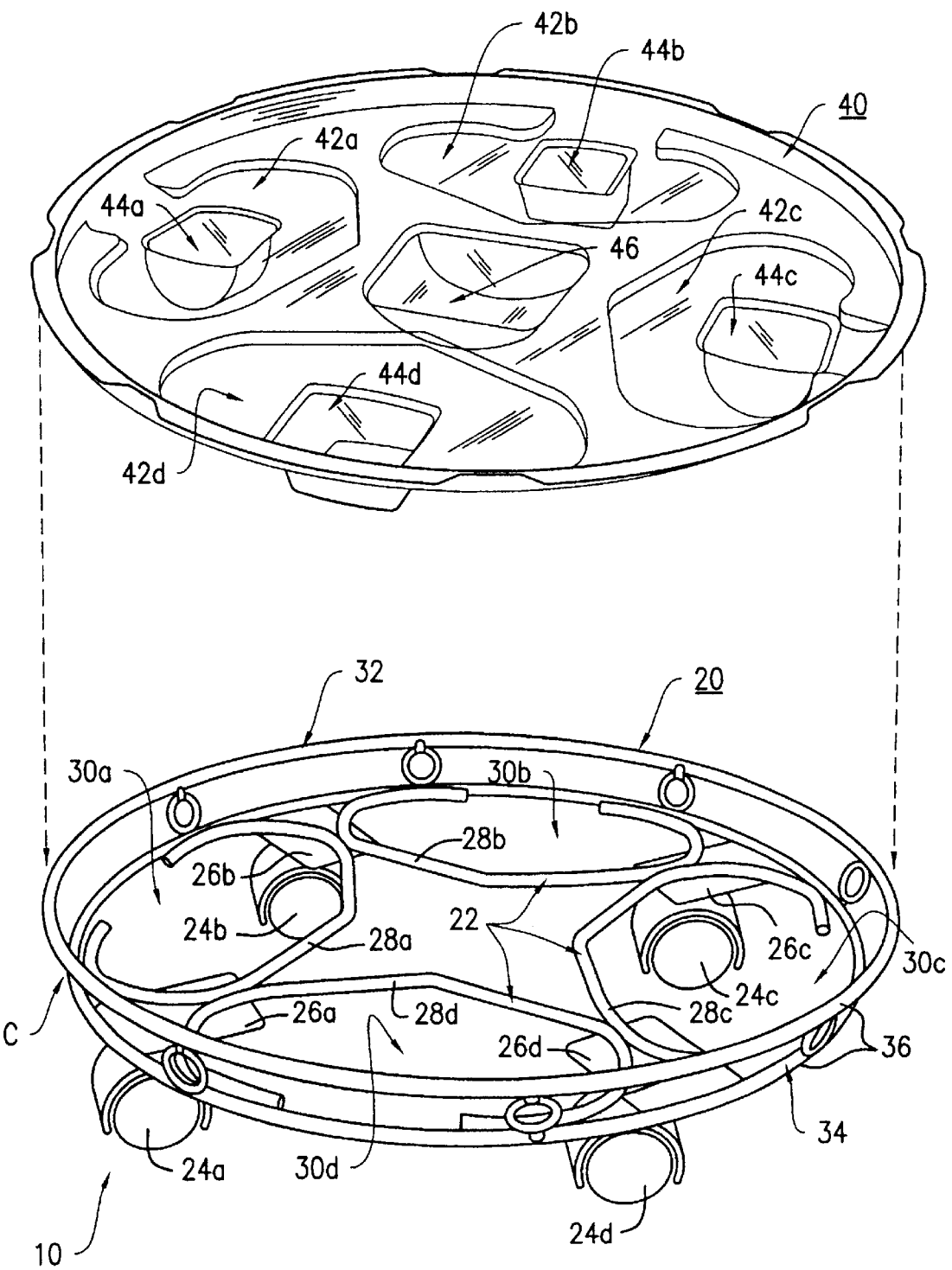
FIG. 3 is an exploded perspective view of the planter caddie of the present invention showing a plastic support fray and a frame member.

Also, the frame member 20, as shown in FIGS. 1 to 3, is in a circular configuration C and has a rim member 32 extending around the periphery 34 of the frame member 20 to form a vertical wall 36. The frame member 20 may be made of moldable and durable hard plastic material or from a metal material such as wrought iron, steel, stainless steel or aluminum. The frame 20 may also have other geometrically-shaped configurations such as a square, a rectangle, a triangle, an oval, and other polygonal shapes or have a non-geometrically shaped configuration.

Figure 5:
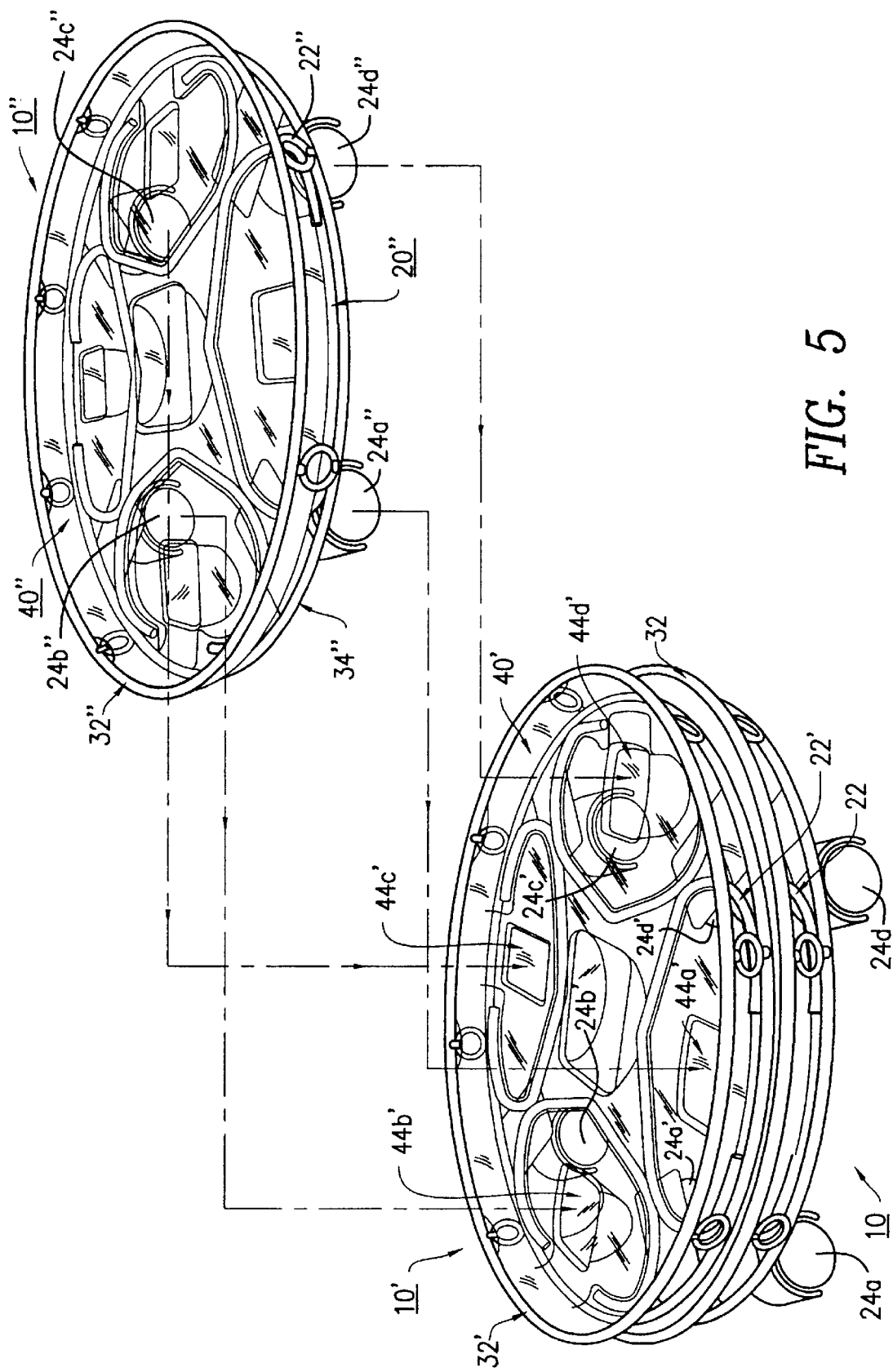
FIG. 5 is an exploded perspective view of the planter caddie of the present invention showing a plurality of planter caddies being stacked with each other.
Figure 6:
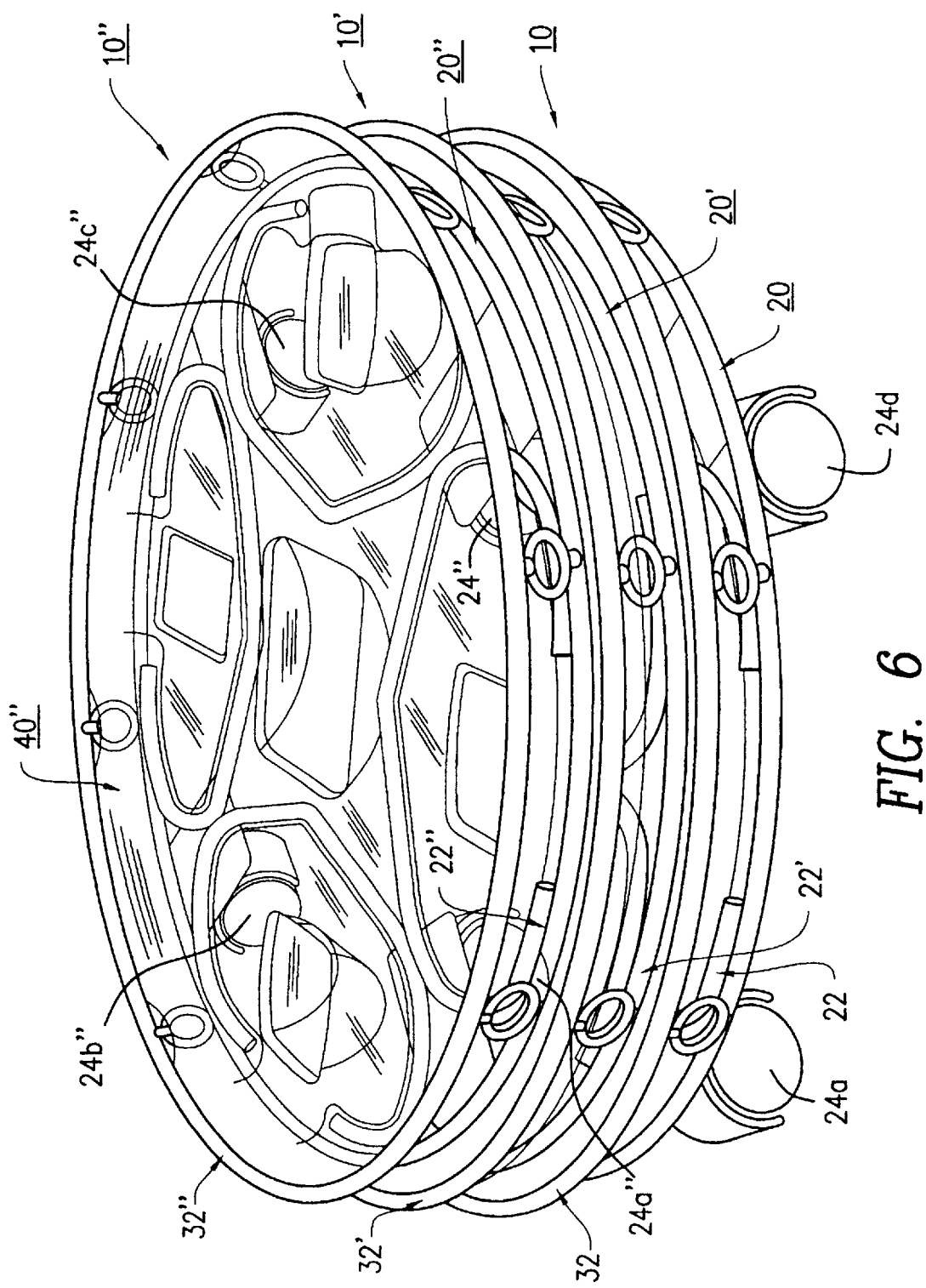
FIG. 6 is a perspective view of the planter caddie of the present invention showing the plurality of planter caddies stacked together for shipment.

The planter caddie 10 also includes a plastic support tray 40 removably disposed on the support surface 22, as depicted in FIGS. 1 and 3. The plastic support tray 40 includes four recessed pockets 42a, 42b, 42c, and 42d for receipt within the four receiving spaces 30a, 30b, 30c and 30d of the four support members 28a, 28b, 28c, and 28d, respectively, as shown in FIGS. 1 and 3 of the drawings, in order to hold support tray 40 securely in place on frame member 20. The support tray 40 is used to support one or more planters 12 thereon. The plastic tray further includes a recessed well 44a, 44b, 44c, and 44d formed within each of the four recessed pockets 42a, 42b, 42c, and 42d, respectively, for collecting of water 14 and for receiving the wheels 24a', 24b', 24c', and 24d' of another planter caddie 10' stacked thereon, as depicted in FIGS. 5 and 6 of the drawings. Additionally, the plastic support tray 40 includes a center recessed well 46 for collecting water 14 from the planter 12 supported on the planter caddie 10. The plastic support tray 40 may be made of a moldable, flexible plastic material. Also, the plastic support tray 40 may be transparent, translucent, or colored (i.e. red, blue, green, yellow, etc.).

In order to allow stacking of the planter caddies 10, the recessed wells of 44a to 44d are spaced apart the same distance as wheels 24a to 24d, in order for the recessed wells 44a to 44d to receive the wheels 24a' to 24d' of another planter caddie 10' to be stacked thereon.

OPERATION OF THE PRESENT INVENTION

In operation, the stacking of multiple planter caddies 10, 10', and 10" of the present invention is performed in the following manner, as shown in FIGS. 5 and 6. The first planter caddie 10 is placed in a shipping carton (not shown), and then a second planter caddie 10' is aligned with the first planter caddie 10 such that each of the wheels 24a', 24b', 24c', and 24d' of planter caddie 10' are received within each of the recessed wells 44a, 44b, 44c, and 44d of planter caddie 10, respectively, as depicted in FIGS. 5 and 6, allowing the support surface 22' of planter caddie 10' to be adjacent with the upper rim member 32 of planter caddie 10. This aforementioned positioning and stacking allows the first and second planter caddies 10 and 10' to be stacked in a compact space-saving manner within the shipping carton.

As shown in FIGS. 5 and 6, a third planter caddie 10" is placed within the shipping carton (not shown), and then the third planter caddie 10" is aligned with the second planter caddie 10' such that each of the wheels 24a", 24b", 24c", and 24d" of planter caddie 10" are received within each of the recessed wells 44a', 44b', 44c', and 44d' of planter caddie 10', respectively, as depicted in FIGS. 5 and 6, allowing the support surface 22" of planter caddie 10" to be adjacent with the upper rim member 32' of planter caddie 10'. This aforementioned positioning and stacking allows the first, second, and third planter caddies 10, 10', and 10" to be stacked in a compact, space-saving manner within the shipping carton in a substantially reduced packaging volume.

ADVANTAGES OF THE PRESENT INVENTION

Accordingly, an advantage of the present invention is that it provides for a planter caddie having a support tray with recessed wells therein for receiving the wheels of another planter caddie for the stacking of multiple planter caddies for compactness during storage in a warehouse or when shipped to a store/nursery outlet.

Another advantage of the present invention is that it provides for a planter caddie such that the recessed wells serve the dual purpose of collecting water from a planter and for allowing the stacking of the planter caddies during shipping in order to save space.

Another advantage of the present invention is that it provides for a planter caddie that has a plastic support tray having a plurality of spaced-apart recessed pockets that are received within support brackets of a frame in order to secure the plastic support tray within the frame.

Another advantage of the present invention is that it provide for a planter caddie that has a has a recessed well being centrally positioned within each recessed pockets for additional collection of excess water from the planter.

Another advantage of the present invention is that it provides for a planter caddie that has a center recessed well within the plastic support tray for the further collection of excess water from the planter.

A further advantage of the present invention is that it provides for a planter caddie that can be mass produced in an automated and economical manner and is readily affordable by the consumer.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A planter caddie for supporting planters, comprising:
   a) a frame having a support surface and a plurality of wheels attached thereto;
   b) said support surface including a plurality of support members for forming receiving spaces in said support surface;
   c) a plastic tray removably disposed on said support surface;
   d) said plastic tray including a plurality of recessed pockets for receipt within said receiving spaces of said plurality of support members;
   e) said plastic tray including a recessed well within each of said plurality of recessed pockets for collecting water and for receiving the wheels of another planter caddie stacked thereon; and
   f) wherein said recessed wells are spaced apart the same distance as said wheels in order for said recessed wells to receive the wheels of another planter caddie to be stacked thereon.

2. A planter caddie in accordance with claim 1, wherein said frame is circular and has a rim member extending around the periphery of said frame to form a vertical wall.

3. A planter caddie in accordance with claim 1, wherein said frame has four wheels attached thereto.

4. A planter caddie in accordance with claim 1, wherein said support surface has four support members for forming four receiving spaces in said support surface.

5. A planter caddie in accordance with claim 4, wherein said plastic tray has four recessed pockets for receipt within said four receiving spaces in said support surface.

6. A planter caddie in accordance with claim 1, wherein said plastic tray includes four recessed wells, and each of said recessed wells is centrally positioned within one of said four recessed pockets.

7. A planter caddie in accordance with claim 1, wherein said plastic tray includes a recessed well in the center thereof for collecting water.

8. A planter caddie in accordance with claim 1, wherein said support surface includes a plurality of wheel support brackets attached thereto.

9. A planter caddie in accordance with claim 8, wherein each of said wheel support brackets includes one of said wheels being swivelly mounted thereon.

10. A planter caddie in accordance with claim 1, wherein said frame is a geometrically-shaped configuration selected from the group consisting of a circle, a square, a rectangle, a triangle, and other polygonal shapes.

11. A planter caddie in accordance with claim 1, wherein said frame is a non-geometrically shaped configuration.

12. A planter caddie in accordance with claim 1, wherein said frame is made of a moldable and durable hard plastic material.

13. A planter caddie in accordance with claim 1, wherein said frame is made of a metal material selected from the group consisting of wrought iron, steel, stainless steel and aluminum.

14. A planter caddie in accordance with claim 1, wherein said plastic tray is made from a moldable, flexible plastic material.

15. A plastic caddie in accordance with claim 14, wherein said plastic tray is transparent, translucent, or colored.

16. A planter caddie for supporting planters, comprising:
   a) a frame having a support surface and four wheels attached thereto;
   b) said support surface including four support members for forming four receiving spaces in said support surface;
   c) a plastic tray removably disposed on said support surface;
   d) said plastic tray including four recessed pockets for receipt within said four receiving spaces of said four support members; and
   e) said plastic tray including four recessed wells, one within each of said four recessed pockets for collecting water and for receiving the wheels of another planter caddie stacked thereon.

17. A planter caddie in accordance with claim 16, wherein said four recessed wells are spaced apart the same distance as said four wheels in order for said four recessed wells to receive the wheels of another planter caddie stacked thereon.

18. A planter caddie in accordance with claim 16, wherein said frame is circular and has a rim member extending around the periphery of said frame to form a vertical wall.

19. A planter caddie in accordance with claim 16, wherein each of said four recessed wells is centrally positioned within one of said four recessed pockets.

20. A planter caddie in accordance with claim 16, wherein said plastic tray includes a recessed well in the center thereof for collecting water.

21. A planter caddie in accordance with claim 16, wherein said support surface includes a plurality of wheel support brackets attached thereto.

22. A planter caddie in accordance with claim 21, wherein each of said wheel support brackets includes one of said wheels being swivelly mounted thereon.

\* \* \* \* \*